United States Patent
Meredith et al.

(10) Patent No.: US 10,932,273 B2
(45) Date of Patent: *Feb. 23, 2021

(54) FACILITATING COMMUNICATION OF RADIO RESOURCE QUALITY TO A MOBILE APPLICATION

(71) Applicant: AT&T Intellectual Property I, L.P., Atlanta, GA (US)

(72) Inventors: Sheldon Meredith, Roswell, GA (US); William Cottrill, Canton, GA (US); Peter Hardie, Lawrenceville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,520

(22) Filed: Feb. 27, 2019

(65) Prior Publication Data

US 2019/0200360 A1 Jun. 27, 2019

Related U.S. Application Data

(63) Continuation of application No. 15/463,081, filed on Mar. 20, 2017, now Pat. No. 10,257,839.

(51) Int. Cl.
| | |
|---|---|
| *H04W 72/04* | (2009.01) |
| *H04W 4/50* | (2018.01) |
| *H04W 4/00* | (2018.01) |
| *H04L 12/825* | (2013.01) |
| *H04W 28/02* | (2009.01) |
| *H04W 72/08* | (2009.01) |

(Continued)

(52) U.S. Cl.
CPC ......... *H04W 72/0486* (2013.01); *H04L 47/25* (2013.01); *H04W 4/00* (2013.01);
(Continued)

(58) Field of Classification Search
CPC ..... H04W 72/0486; H04W 4/50; H04W 4/00; H04W 28/02
See application file for complete search history.

(56) References Cited

U.S. PATENT DOCUMENTS 6,151,484 A * 11/2000 Ramesh ................. H04B 7/005
375/232
6,263,503 B1 * 7/2001 Margulis ............. H04L 12/2812
725/81

(Continued)

FOREIGN PATENT DOCUMENTS

| EP | 1931148 B1 | 11/2011 |
|---|---|---|
| FR | 3020544 A1 | 10/2015 |
| WO | 02054685 A1 | 7/2002 |
| WO | 2013188105 A1 | 12/2013 |
| WO | 2016130749 A1 | 8/2016 |

OTHER PUBLICATIONS

Oyman et al., "Quality of Experience for HTTP Adaptive Streaming Services," QoE Management in Emerging Multimedia Services, IEEE Communications Magazine, Apr. 2012, pp. 20-27, vol. 50, No. 4, 8 pages.

(Continued)

*Primary Examiner* — Parth Patel
(74) *Attorney, Agent, or Firm* — Amin, Turocy & Watson, LLP

(57) ABSTRACT

Facilitation of communication of radio resource quality to a mobile application is provided. In one example, a method comprises: determining, by a device coupled to a processor, a peak-to-average loading ratio of a loading of a radio of a base station device and a mobility factor of the radio, wherein the loading relates to an amount of data being handled by the radio; and determining, by the device, class information for the radio of the base station device, wherein the class information comprises a value indicative of the peak-to-average loading ratio and the mobility factor of the radio, wherein the class information is correlatable to a bit rate at which a mobile device is to execute an application of a mobile device, and wherein the radio is communicatively coupled to the mobile device.

20 Claims, 10 Drawing Sheets

(51) Int. Cl.
  *H04W 8/18* (2009.01)
  *H04W 4/06* (2009.01)
  *H04W 4/80* (2018.01)
  *H04W 8/22* (2009.01)

(52) U.S. Cl.
  CPC .............. *H04W 4/50* (2018.02); *H04W 8/18* (2013.01); *H04W 28/02* (2013.01); *H04W 28/0226* (2013.01); *H04W 28/0284* (2013.01); *H04W 72/085* (2013.01); *H04W 4/06* (2013.01); *H04W 4/80* (2018.02); *H04W 8/22* (2013.01)

(56) References Cited

U.S. PATENT DOCUMENTS

| | | | | |
|---|---|---|---|---|
| 6,539,221 | B1* | 3/2003 | Vasudevan | H04W 16/18 455/423 |
| 6,563,808 | B1* | 5/2003 | Cox | H04J 13/0048 370/320 |
| 7,917,356 | B2 | 3/2011 | Chen et al. | |
| 8,675,577 | B2* | 3/2014 | Oyman | H04L 47/26 370/329 |
| 8,693,320 | B2* | 4/2014 | Furbeck | H04L 47/10 370/229 |
| 8,776,161 | B2* | 7/2014 | Gazier | H04N 21/222 375/240.07 |
| 9,131,406 | B2* | 9/2015 | Park | H04W 36/32 |
| 9,246,842 | B2* | 1/2016 | Oyman | H04W 24/06 |
| 9,264,872 | B2* | 2/2016 | Sen | H04W 4/18 |
| 9,264,960 | B1* | 2/2016 | Tailor | H04W 36/165 |
| 9,286,620 | B2* | 3/2016 | Matthews | H04L 43/065 |
| 9,307,357 | B1* | 4/2016 | Murff | H04W 8/02 |
| 9,584,419 | B1* | 2/2017 | Gilgur | H04L 47/11 |
| 9,622,044 | B2* | 4/2017 | Brisebois | G01C 21/28 |
| 9,729,497 | B2* | 8/2017 | Lee | G06Q 50/01 |
| 9,794,820 | B1* | 10/2017 | Marupaduga | H04B 17/318 |
| 9,813,889 | B2* | 11/2017 | Keskitalo | H04W 24/02 |
| 9,843,981 | B2* | 12/2017 | Yan | H04W 8/04 |
| 2002/0090024 | A1* | 7/2002 | Tan | H04B 1/707 375/146 |
| 2002/0106004 | A1* | 8/2002 | Tan | H04B 1/707 375/140 |
| 2002/0160782 | A1* | 10/2002 | Joshi | H04W 28/22 455/452.1 |
| 2004/0098748 | A1 | 5/2004 | Bo et al. | |
| 2005/0143086 | A1 | 6/2005 | Schwarz | |
| 2007/0189201 | A1* | 8/2007 | Feder | H04W 36/22 370/328 |
| 2007/0268914 | A1* | 11/2007 | Fisher | H04L 12/2856 370/400 |
| 2008/0043648 | A1* | 2/2008 | Buga | H04L 41/046 370/310 |
| 2008/0143518 | A1* | 6/2008 | Aaron | H04M 1/72569 340/540 |
| 2008/0151812 | A1* | 6/2008 | Camp, Jr. | H04B 7/2681 370/320 |
| 2008/0194204 | A1* | 8/2008 | Duet | H04W 8/005 455/63.4 |
| 2008/0233958 | A1* | 9/2008 | Robbins | H04W 36/0094 455/436 |
| 2008/0250142 | A1* | 10/2008 | Magnusson | H04W 48/20 709/225 |
| 2009/0113039 | A1* | 4/2009 | Savoor | H04L 63/102 709/224 |
| 2009/0185492 | A1* | 7/2009 | Senarath | H04B 7/155 370/238 |
| 2009/0274103 | A1* | 11/2009 | Yang | H04L 5/0007 370/329 |
| 2010/0094950 | A1* | 4/2010 | Zuckerman | H04L 67/1008 709/213 |
| 2010/0094967 | A1* | 4/2010 | Zuckerman | H04L 67/1097 709/219 |
| 2011/0039544 | A1* | 2/2011 | Fulghum | H04L 1/0002 455/423 |
| 2011/0249549 | A1* | 10/2011 | Hao | H04J 13/0062 370/208 |
| 2011/0263262 | A1* | 10/2011 | Min | H04W 36/0083 455/438 |
| 2011/0320588 | A1* | 12/2011 | Raleigh | H04W 36/245 709/224 |
| 2012/0013748 | A1* | 1/2012 | Stanwood | H04L 47/32 348/192 |
| 2012/0250611 | A1* | 10/2012 | Yang | H04W 76/30 370/328 |
| 2013/0130670 | A1* | 5/2013 | Samdanis | H04W 24/02 455/418 |
| 2013/0143542 | A1* | 6/2013 | Kovvali | H04W 88/18 455/418 |
| 2013/0166580 | A1* | 6/2013 | Maharajh | H04L 65/605 707/758 |
| 2013/0208610 | A1* | 8/2013 | Mach | H04W 24/10 370/252 |
| 2014/0221014 | A1* | 8/2014 | Li | G06F 16/00 455/456.3 |
| 2014/0258449 | A1* | 9/2014 | Holden | H04L 65/60 709/217 |
| 2014/0269284 | A1* | 9/2014 | Amanna, III | H04L 5/0037 370/230.1 |
| 2014/0301308 | A1* | 10/2014 | Hahn | H04W 76/11 370/329 |
| 2014/0334421 | A1* | 11/2014 | Sosa | H04L 5/0064 370/329 |
| 2014/0371940 | A1* | 12/2014 | Ilic | H02J 3/38 700/297 |
| 2015/0038151 | A1* | 2/2015 | Dalsgaard | H04W 36/0088 455/444 |
| 2015/0042406 | A1 | 2/2015 | Kovac et al. | |
| 2015/0055525 | A1* | 2/2015 | Ma | H04W 24/02 370/281 |
| 2015/0103657 | A1* | 4/2015 | Henderson | H04W 36/0083 370/232 |
| 2015/0105094 | A1* | 4/2015 | Kotecha | H04W 24/02 455/452.2 |
| 2015/0111569 | A1* | 4/2015 | Gupta | H04L 65/1069 455/426.1 |
| 2015/0141027 | A1* | 5/2015 | Tsui | H04W 52/243 455/452.1 |
| 2015/0256581 | A1* | 9/2015 | Kolhi | H04L 65/602 709/219 |
| 2015/0296367 | A1* | 10/2015 | Keskitalo | H04W 24/02 370/328 |
| 2015/0358190 | A1* | 12/2015 | Kruglick | H04L 27/2617 370/328 |
| 2016/0066252 | A1* | 3/2016 | Parron | H04W 48/16 455/434 |
| 2016/0135035 | A1* | 5/2016 | Chan | H04W 28/0226 370/328 |
| 2016/0218682 | A1 | 7/2016 | Lyalin et al. | |
| 2016/0234049 | A1* | 8/2016 | Azizi | H04B 7/0452 |
| 2016/0242109 | A1* | 8/2016 | Kwak | H04W 48/16 |
| 2016/0302143 | A1* | 10/2016 | Karlsson | H04W 48/20 |
| 2016/0366202 | A1* | 12/2016 | Phillips | H04L 43/08 |
| 2017/0013477 | A1* | 1/2017 | Yamada | H04W 24/02 |
| 2017/0026887 | A1* | 1/2017 | Sirotkin | H04W 28/08 |
| 2017/0264449 | A1* | 9/2017 | Seetharaman | H04L 67/1008 |
| 2017/0325120 | A1* | 11/2017 | Szilagyi | H04W 28/24 |
| 2018/0139760 | A1* | 5/2018 | Lee | H04W 28/0268 |
| 2018/0213078 | A1* | 7/2018 | Visuri | H04M 15/8044 |
| 2018/0249383 | A1* | 8/2018 | Martin | H04W 36/0083 |
| 2018/0270832 | A1* | 9/2018 | Meredith | H04W 72/0486 |

OTHER PUBLICATIONS

Singh et al., "Quality of Experience estimation for Adaptive HTTP/TCP video streaming using H.264/AVC," IEEE Consumer Communications and Networking Conference (CCNC), Jan. 2012, 6 pages.

(56) References Cited

OTHER PUBLICATIONS

Kumar et al., "QoE Evaluation for Video Streaming over eMBMS," Journal of Communications, Jun. 2013, pp. 352-358, vol. 8, No. 6, 7 pages.
Essaili et al., "Quality-of-Experience driven Adaptive HTTP Media Delivery," International Conference on Communications (ICC), 2013, IEEE, 6 pages.
Mok et al., "QDASH: A QoE-aware DASH system," Proceedings of the 3rd Multimedia Systems Conference, 2012, pp. 11-22, ACM, 12 pages.
Garudadri et al., "Rate Adaptation for Video Telephony in 3G Networks," 2007, IEEE, 7 pages.
Notice of Allowance dated Nov. 29, 2018 for U.S. Appl. No. 15/463,081, 29 pages.
Office Action dated Jun. 29, 2018 for U.S. Appl. No. 15/463,081, 66 pages.

* cited by examiner

| USER-SPECIFIC INFORMATION / THROTTLE COMMAND INFORMATION 122 | CLASS INFORMATION 124 / THROTTLE COMMAND INFORMATION 122 | MIME INFORMATION / THROTTLE COMMAND INFORMATION 122 | DOMAIN INFORMATION / THROTTLE COMMAND INFORMATION 122 |
|---|---|---|---|
| PREMIUM USER / NO THROTTLE | CLASS 5 / THROTTLE | CLASS 6 | DOMAIN X / NO THROTTLE |
| STANDARD USER / NO THROTTLE | CLASS 2 / NO THROTTLE | CLASS 1 | DOMAIN Y / THROTTLE |
| BEST EFFORT USER / THROTTLE | CLASS 7 / THROTTLE | CLASS 7 | DOMAIN Z / NO THROTTLE |

FIG. 5A

| CLASS INFORMATION 124 (TIME 1) | BIT RATE |
|---|---|
| CLASS 1-2 | MAXIMUM |
| CLASS 3-4 | INTERMEDIATE |
| CLASS 5 - 7 | MINIMUM |

FIG. 5B

| RADIO OF BASE STATION DEVICE 108 | CLASS INFORMATION 124 (TIME 1) | LOADING DESIGNATION 502 (TIME 1) | CLASS INFORMATION 124 (TIME 2) | LOADING DESIGNATION 502 (TIME 2) | TREND FROM TIME 1 TO TIME 2 | PEAK-TO-AVERAGE LOADING RATIO | MOBILITY FACTOR |
|---|---|---|---|---|---|---|---|
| IDENTIFIER FOR RADIO 128 | CLASS 5 | HEAVILY LOADED | CLASS 6 | HEAVILY LOADED | INCREASING | XXY | LOW |
| IDENTIFIER FOR RADIO 130 | CLASS 2 | LIGHTLY LOADED | CLASS 1 | LIGHTLY LOADED | DECREASING | IFEO | HIGH |
| IDENTIFIER FOR RADIO 132 | CLASS 7 | HEAVILY LOADED | CLASS 7 | HEAVILY LOADED | CONSTANT | FEIE | HIGH |

FIG. 5C

FACILITATING COMMUNICATION OF RADIO RESOURCE QUALITY TO A MOBILE APPLICATION

RELATED APPLICATION

The subject patent application is a continuation of, and claims priority to, U.S. patent application Ser. No. 15/463,081, filed Mar. 20, 2017, and entitled "FACILITATING COMMUNICATION OF RADIO RESOURCE QUALITY TO A MOBILE APPLICATION," the entirety of which application is hereby incorporated by reference herein.

TECHNICAL FIELD

The subject disclosure relates generally to communication systems, and, for example, to systems, methods and/or machine-readable storage media for facilitating communication of radio resource quality to a mobile device application.

BACKGROUND

When a mobile device software application begins a multimedia session, the application typically does not have prior information at its disposal about the base station (BS) device radio and loading level of the radio. If a BS device radio is heavily loaded, it is less likely to support high bit rate video sessions. If the mobile application begins a video session using high bit rate, it is more prone to failure, frame pausing, and eventually downgrading of the bit rate (assuming the bit rate is variable). If the bit rate is not variable, the multimedia session is more prone to failure. Current methods cause mobile applications to test radio links by sending ping messages, receiving acknowledgements to test latency and sending data packets on the order of 10 kilobytes (KB) to discover throughput information. Unfortunately, this can cause delay in the establishment of the multimedia session and can also tax the radio interface.

BRIEF DESCRIPTION OF THE DRAWINGS

FIG. 5A illustrates an example, non-limiting block diagram of a control device table that can be employed to facilitate determination of throttling command information in accordance with one or more embodiments described herein.

FIG. 5B illustrates an example, non-limiting block diagram of a mobile device table that can be employed to facilitate determination of bit rate for an application to be executed at the mobile device in accordance with one or more embodiments described herein.

FIG. 5C illustrates an example, non-limiting block diagram of a control device table that can be employed to facilitate determination of class information in accordance with one or more embodiments described herein.

DETAILED DESCRIPTION

Figure 1:
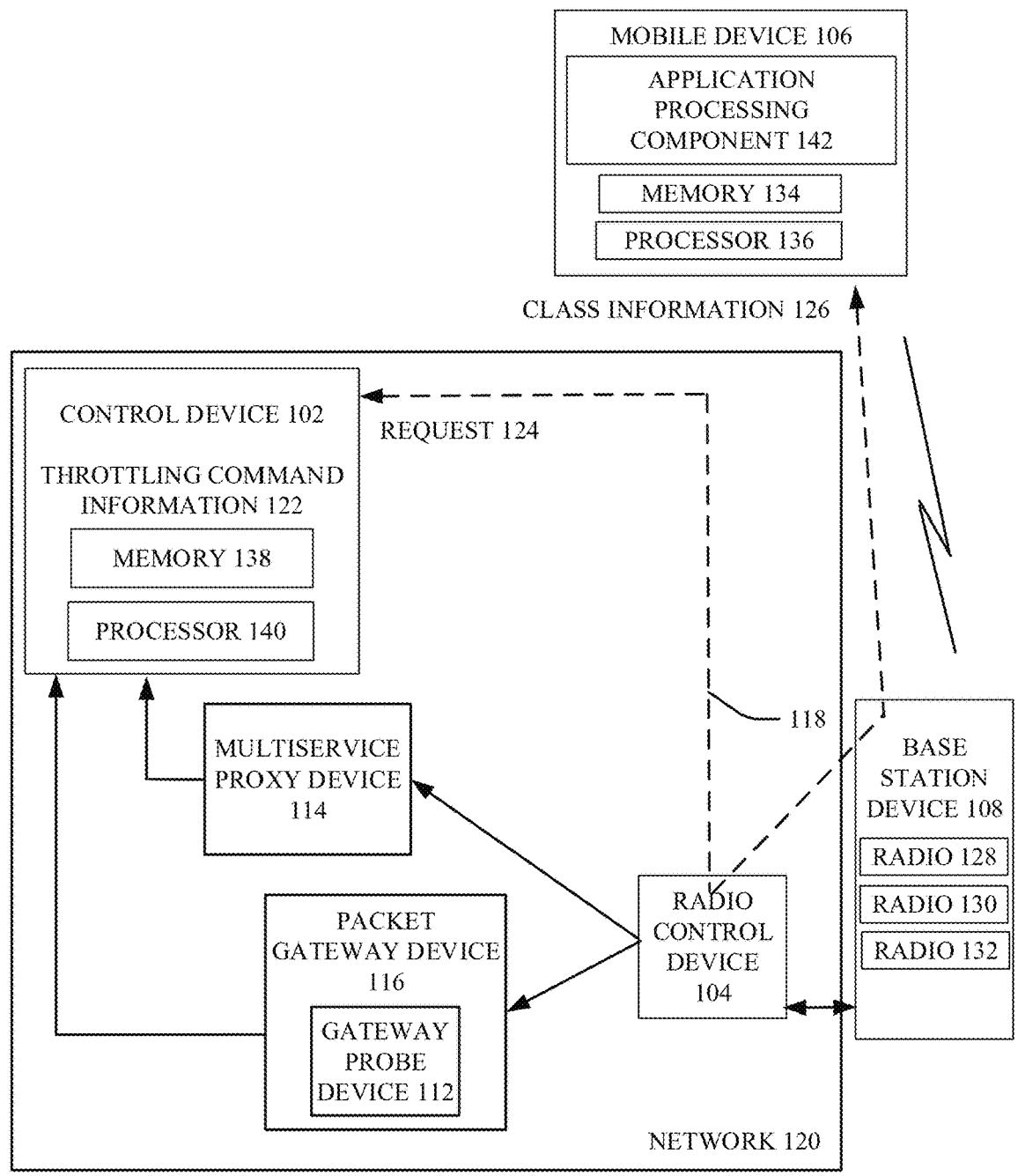
FIG. 1 illustrates an example, non-limiting system that facilitates communication of radio resource quality to a mobile application in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

For every radio of a BS device in the network, the demanded load and any throttling actions being taken for the BS device can be known. When a mobile device software application begins a multimedia session, the application typically does not have prior information at its disposal about the base station (BS) device radio and loading level of the radio. If a BS device radio is heavily loaded, it is less likely to support high bit rate video sessions. If the mobile application begins a video session using high bit rate, it is more prone to failure, frame pausing, and eventually downgrading of the bit rate (assuming the bit rate is variable). If the bit rate is not variable, the multimedia session is more prone to failure. Current methods cause mobile applications to test radio links by sending ping messages, receiving acknowledgements to test latency and sending data packets on the order of 10 kilobytes (KB) to discover throughput information. Unfortunately, this can cause delay in the establishment of the multimedia session and can also tax the radio interface.

Accordingly, one or more embodiments described herein can provide systems, methods and/or machine-readable storage media that can facilitate establishment of a multimedia session at the optimal bit rate and, in some embodiments, providing advance notice about the load trending on a BS device radio so that changes to multimedia session bit rate can be anticipated before the change begins to excessively affect the delivery of data (e.g., video delivery).

In one embodiment, a method can comprise determining, by a device coupled to a processor, a peak-to-average loading ratio of a loading of a radio of a base station device and a mobility factor of the radio, wherein the loading relates to an amount of data being processed by the radio. The method can also comprise determining, by the device, class information for the radio of the base station device, wherein the class information comprises a value indicative of the peak-to-average loading ratio and the mobility factor of the radio, wherein the class information is correlatable to a bit rate at which a mobile device is to execute an application of a mobile device, and wherein the radio is communicatively coupled to the mobile device.

In another embodiment, another method is provided. The method comprises requesting, by a mobile device coupled to a processor, class information for a radio of a base station device to which the mobile device is communicatively coupled; and determining, by the mobile device, a bit rate at which to execute an application at the mobile device, wherein the determining is based on receiving the class information from a control device, wherein the class information is a function of loading at the radio and a mobility parameter of the radio, and wherein the loading refers to an amount of data being handled by the radio.

In another embodiment, a machine-readable storage medium is provided. The machine-readable storage medium comprises executable instructions that, when executed by a processor, facilitate performance of operations. The operations can comprise: determining a peak-to-average loading ratio of a loading of a radio of a base station device and a mobility factor of the radio, wherein the loading is indicative of an amount of data being processed by the radio; and determining class information for the radio of the base station device, wherein the class information comprises a first value indicative of the peak-to-average loading ratio and a second value indicative of the mobility factor of the radio, wherein the class information is correlatable to a bit rate at which an application is to be executed on a mobile device, and wherein the mobile device is communicatively coupled to the radio.

One or more embodiments can allow radio loading conditions (e.g., real-time radio loading conditions) to be communicated to a mobile device software application. These conditions can allow the mobile application to begin multimedia data sessions with target bit rates for the purposes of maintaining reasonably uniform video experience for the mobile device. One or more embodiments described herein can obviate or reduce the need for the mobile device software application to test the radio link for latency and/or for throughput.

In one or more embodiments, if the mobile device software application knows about the loading (e.g., instantaneous loading) and throttling and/or the trend of loading and/or throttling, then the system can better anticipate when the bit rate should be changed and produce a more desirable overall multimedia experience. This can also reduce control messaging to adjust bandwidth of the radio resources assigned to the mobile device, which can help avoid (or reduce the likelihood of) control plane signaling congestion and/or produce a more robust experience for all mobile devices actively using that particular BS device radio. In some embodiments, since the mobile application no longer needs to send ping messages and receive acknowledgments to test latency or fixed 10 KB files, this can eliminate or reduce the likelihood of occurrence of the associated delays and impacts on the radio frequency network interface.

Figure 2:
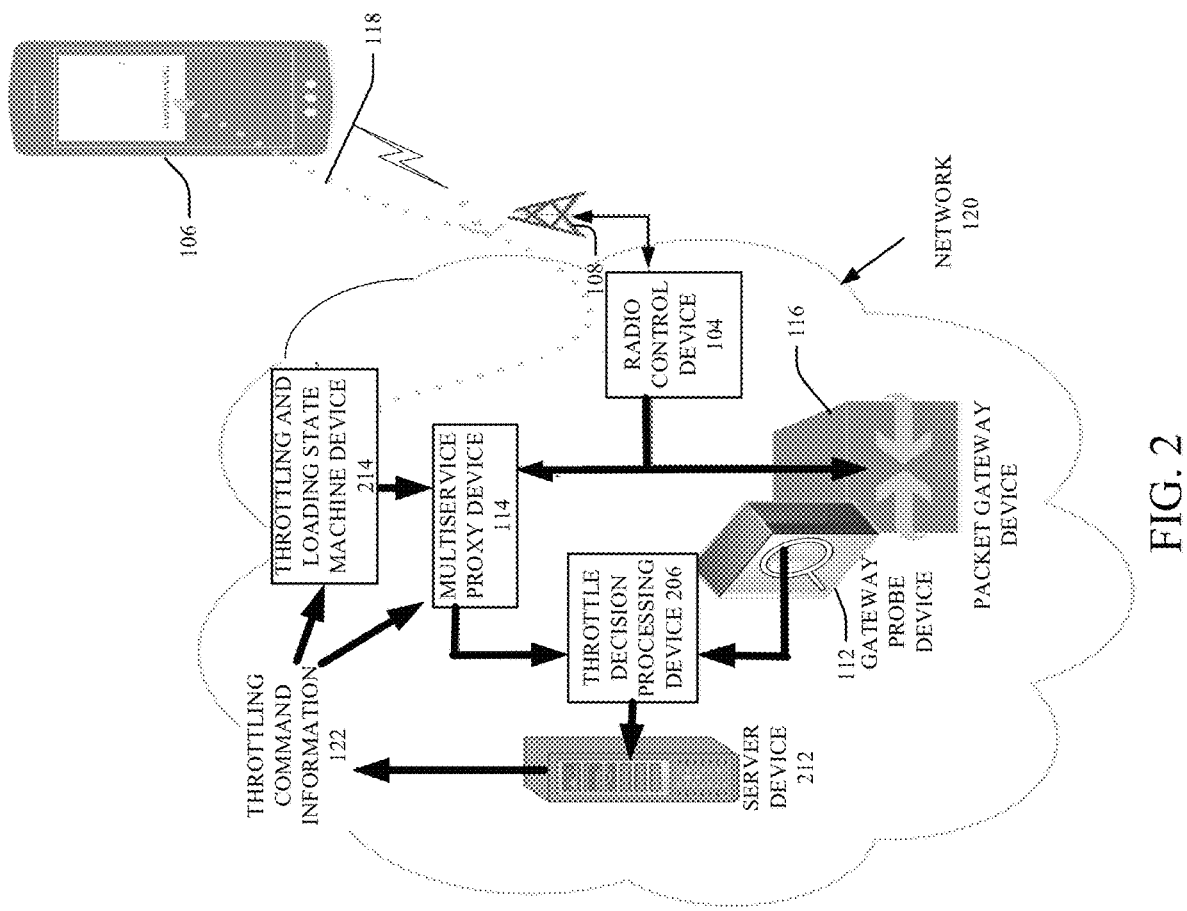
FIG. 2 illustrates an example, non-limiting another system that facilitates communication of radio resource quality to a mobile application in accordance with one or more embodiments described herein.

FIG. 1 illustrates an example, non-limiting system (e.g., 100) that facilitates communication of radio resource quality to a mobile application in accordance with one or more embodiments described herein. FIG. 2 illustrates an example, non-limiting another system (e.g., system 200) that facilitates communication of radio resource quality to a mobile application in accordance with one or more embodiments described herein. Repetitive description of like elements employed in other embodiments described herein is omitted for sake of brevity.

Turning first to FIG. 1, as shown, system 100 can include control device 102, multiservice proxy device 114, gateway probe device 112, packet gateway device 116 and radio control device 104. In some embodiments, the system 100 can also include BS device 108 (which can have one or more radios 128, 130, 132 that can communicate with different mobile devices (e.g., mobile device 106) in respective sectors of a cell site covered by BS device 108. In some embodiments, the mobile device 106 can be included in the system 100. In various embodiments, one or more of the control device 102, multiservice proxy device 114, gateway probe device 112, packet gateway device 116, radio control device 104, the BS device 108 and/or the mobile device 106 can be electrically and/or communicatively coupled to one another to perform one or more functions of system 100.

The mobile device 106 can include memory 134 and processor 136. The memory 134 can store instructions that can be executed by processor 136 to perform one or more functions of control device 102 including, but not limited to, determination of bit rate at which to initiate an application. The application processing component 142 can receive class information 126 and determine the bit rate at which to initiate the application on the mobile device 106.

In one or more embodiments, the control device 102 can include hardware, software, firmware or a combination of hardware, software and firmware. In some embodiments, the control device 102 can collect information that can be obtained from multiservice proxy device 114 and/or a packet gateway device 116. For example, in some embodiments, the multiservice proxy device 114 and/or a packet gateway device 116 can output to the control device 102 information regarding the loading of the data associated with one or more radios 128, 130, 132 of the BS device 108. In some embodiments, the loading of the radios 128, 130, 132 can be the amount of data being processed by the radios 128, 130, 132.

In some embodiments, the packet gateway device 116 can be a network device (e.g., an LTE network device). The packet gateway device 116 can bifurcate the traffic being handled by one or more radios 128, 130, 132 into voice traffic and packet traffic. The multiservice proxy device 114 can be on the packet side of the resultant stream. From either the multiservice proxy device 114 and/or the packet gateway device 116, the control device 102 can collect information that is indicative of radio loading. In some embodiments, the information collected can indicate whether a particular one or more of radios 128, 130, 132 of BS device (e.g., BS device 108) is loaded at a first amount (e.g., heavily loaded), loaded at a second amount (e.g., lightly loaded) or loaded at a third amount (e.g., intermediate level loading). Any number of levels of loading can be identified.

Further detail regarding the control device 102 can be as described with reference to FIGS. 1 and 2. One or more of the structure and/or functionality of control device 102 can be as described in FIG. 1 or FIG. 2 (or, later, in FIG. 3 or 4). FIG. 2 shows another embodiment of system 100. For example, FIG. 2 shows system 200, which illustrates numerous different components server device 212, throttle decision processing device 206, and/or throttling and loading state machine device 214. In some embodiments, although not shown, one or more of the server device 212, throttle decision processing device 206, and/or throttling and loading state machine device 214 can be included within and as part of the control device 102. In some embodiments, although not shown, the server device 212 can include the throttle decision processing device 206 and therefore the processing performed by the throttle decision processing device 206 and the receipt of information from the multiservice proxy device 114 and/or the gateway probe device 112 can be processed and/or received by the server device 212. As shown in FIG. 2, in some embodiments, the control device 102 can include a server device 212 that can perform functions including, but not limited to, outputting and/or generating throttling command information 122. In some embodiments, the server device 212 can include the throttle decision processing device 206.

In some embodiments, the control device 102 (or, in some embodiments, the server device 212 or the throttle decision processing device 206 of the server device 212) can collect information from the multiservice proxy device 114 and/or packet gateway device 116 and process the information collected to obtain the physical resource block (PRB) loading and/or the tonnage of information being transmitted per unit time via one or more of radios 128, 130, 132. Based on this information, server device 212 can receive such information and can decide for which one or more of radios 128, 130, 132 of BS device 108 to throttle data. As used herein, the term "throttle" can mean to reduce a speed of data transfer. As such, a radio that is throttled can transfer data at a reduced speed (or data transfer can be stopped altogether) for a defined amount of time.

In some embodiments, other factors (other than loading) can be taken into account to determine whether to throttle data of a radio. By way of example, in some embodiments, the control device 102 (or, in some embodiments, the server device 212 or the throttle decision processing device 206 of the server device 212) can generate one or more decisions regarding which one or more of radios 128, 130, 132 to throttle based on the particular Multipurpose Internet Mail Extensions (MIME) type of the data being processed by the radios 128, 130, 132. For example, a decision can be made by the control device 102 to reduce the rate of transfer of video and/or Joint Photographic Experts Group (JPEG).

In some embodiments, the control device 102 can determine whether to throttle data for one or more of radios 128, 130, 132 based on the specific website and/or the specific web domain from which the data originates. For example, in some embodiments, the control device 102 can selectively throttle data associated with particular domains and/or websites.

In some embodiments, the control device 102 can determine whether to throttle data for one or more of radios 128, 1320, 132 based on a subscriber-specific information (e.g., a particular subscriber could be paying for a particular premium level of service). Different subscribers can have paid for different levels of service and therefore the subscribers may be throttled less based on a policy that throttles subscribers that pay for premium service less than subscribers that pay for best effort service.

FIG. 5A illustrates an example, non-limiting block diagram of a control device table that can be employed to facilitate determination throttling command information in accordance with one or more embodiments described herein. Repetitive description of like elements employed in other embodiments described herein is omitted for sake of brevity.

As shown in the table, different subscriber-specific, loading, MIME information and/or domain-information can be employed to determine whether to throttle data for a radio of a BS device. As such, in various embodiments, whether the data being considered is JPEG, email, power point slide and/or video, adaptive bit rate video versus fixed rate video can be taken into account to determine the throttling of the data. For example, in some embodiments, the control device 102 can determine that a particular one of one or more radios 128, 130, 132 of BS device 108 is becoming loaded with data and therefore can decide to throttle the data at the radio.

In some embodiments, the data throttling can be performed by insertion of one or more delays in the packet flow at the one of one or more radios 128, 130, 132 of BS device 108. In another example, the control device 102 can throttle a particular subscriber, a particular type of data and/or a particular domain to which data is going and/or from which data is coming or originating.

In some embodiments, as shown in FIG. 2, throttling command information 122 can be output from the control device 102 (and/or the server device 212 of the control device 102). In some embodiments, the throttling command information 122 can be output directly to the multiservice proxy device 114 to cause the multiservice proxy device 114 to throttle the packet flow (at which point the throttling is internal to the network).

As an alternative, the throttling command information 122 can be output to the throttling and loading state machine device 214 and there can be a radio control device 104 that can generate one or more commands to control a radio of the BS device 108 (e.g., whether the radio BS device 108 throttles data and/or the subscriber, data type, data origin/destination and/or website for throttling by the radio of the BS device 108). In some embodiments, the throttling and loading state machine device 214 can store and/or access a state (e.g., history) of the radio of the BS device 108 in terms of loading and/or the trend (e.g., whether the loading in the BS device 108 is increasing or decreasing).

In some embodiments, whether the BS device 108 has a high mobility factor can also be determined. The mobility factor is the amount of change in the number of mobile devices being processed by a radio of a BS device over time. In some embodiments, if there is a low mobility factor (and the particular number and identity of mobile devices are therefore not changing very much over time) there is a good likelihood that the radio of the BS device is serving a residential area. By contrast if there is very high mobility factor (and mobile devices are all different after five minutes) this implies that there may be a fast-moving environment (e.g., highway) for which the BS device 108 is handling mobile devices. The mobile device identifiers (IDs) that are using the radio BS device 108 at a defined time can be identified and in a defined amount of time later (e.g., five minutes later) a determination can be made as to whether the mobile device IDs five minutes later are the same as those that were using the radio BS device 108 five minutes earlier to determine the mobility factor of a radio.

The throttling decision can take into account the mobility factor of a radio of a BS device in determining throttling command information 122 for the radio because if the radio has a high mobility any decision about throttling may only be in effect for a few seconds. By contrast, if throttling decision is made for a radio that has a low mobility factor, it is likely to be in effect for a longer period of time.

In some embodiments, the peak-to-average loading ratio of loading at a particular radio of a BS device can be indicative of the type of data being handled by the BS device. For example, if a particular radio of a BS device is playing a movie, the throughput of the movie being downloaded would show a low peak-to-average loading because there is a constant stream of data. By contrast, the peak-to-average loading for short videos (e.g., videos on the YOUTUBE® platform) would be higher because there is peak usage that is much higher than average usage because different users are viewing different videos and some are simultaneous and others are not. Another scenario could be interactive background usage (e.g., mobile devices visiting a number of different websites) so there are a number of objects being transmitted to load a webpage so there is a high peak-to-average loading ratio for the downloading that is occurring. The worst scenario (e.g., highest peak-to-average loading ratio) can be with checking text messages constantly with a number of different mobile devices.

Accordingly, in some embodiments, the control device 102 can determine the average loading over a defined time for a defined radio of a BS device, the trend of loading (e.g., increasing or decreasing or substantially constant), the mobility factor of the radio of the BS device (e.g., according to mobile device IDs changing over unit time) and/or the peak-to-average loading ratio of loading.

The control device 102 can compute a loading (e.g., instantaneous and/or average loading) and a peak-to-average loading ratio (e.g., indicative of what is the traffic on the radio of the BS device 108). Accordingly, if the mobile device (e.g., mobile device 106) is playing a video and the mobile device 106 is stitching data together, if there is one radio of the BS device where the average loading is 70% but the peak-to-average implies standard deviation of 20% then there can be significant variability in loading. If the variability increases significantly, the radio may be unable to continue transfer of loading at the time. However, if another site running 85% average loading but the peak-to-average loading is much less than 20%, then it might be better to transfer video on that particular radio of the BS device having the lower peak-to-average loading. As such, the decision as to how much to throttle, what to throttle (what type of data) and/or who to throttle (which radio of the BS device) can be determined by the control device 102 dependent on the average loading and the peak-to-average loading. In one example, the average loading plus a standard deviation can be employed as the defined threshold at which throttling is initiated.

In some embodiments, the control device 102 (or, in some embodiments, the server device 212 or the throttle decision processing device 206 of the server device 212) can determine and/or collect information (e.g., average loading, peak-to-average loading and/or average loading plus one standard deviation) for one or more radios of the BS device 108.

As shown in FIGS. 1 and 2, in some embodiments, there can be different devices and/or numbers of devices to perform one or more functions of the system 100, 200. In one embodiment, although the server device 212 is shown separate from the throttle decision processing device 206 in FIG. 2, in some embodiments, the throttle decision processing device 206 is included as part of the server device 212, all such embodiments are envisaged. Further, the throttling and loading state machine device 214 can, in some embodiments, be included as part of the server device 212. As another example, in some embodiments, the throttling and loading state machine device 214 can be included as part of the server device 212 to minimize latency.

FIG. 2 also illustrates the control device 102 ability to generate and/or output class information for mobile device determination of an initial bit rate at which to execute an application on the mobile device. The communication path 118 from the mobile device 106 to the throttling and loading state machine device 214, to minimize latency and decrease the time taken for communications between the mobile device 106 and the loading of the throttling and loading state machine device 214, in some embodiments, the loading of the throttling and loading state machine device 214 would likely be positioned on the processing edge (e.g., as close to the BS device 108 as possible). By way of example, but not limitation, there can be technical centers with respective throttling and loading state machine device 214 in different locations within a region (e.g., a region can be a country, state, portion of a country such as the southeast region of the United States and otherwise). In some embodiments, one throttling and loading state machine device can be distributed in each technical center (or, in some embodiments, one or more technical centers) for an organization.

In some embodiments, if three regions relatively near one another (e.g., Palo Alto, San Jose, Santa Monica) are connected to technical center, then there can be a local telephone switching office device supporting the throttling and loading state machine device 214 for the particular region or technical center to get closer to the BS device 108 (and therefore speed up the throttling decision-making and output of the throttling and loading state machine device 214).

As shown, the mobile device 106 can communicate over the communication path 118 via the BS device 108 to the throttling and loading state machine device 214. The communication path 118 can be a local path between the mobile device 106 and the throttling and loading state machine device 214 in some embodiments. In some embodiments, the communication path 118 can include a query from the mobile device 106 of the throttling and loading state machine device 214, For example, the communication path 118 can show the mobile device 106 querying the throttling and loading state machine device 214, informing the throttling and loading state machine device 214 that the mobile device 106 is preparing to conduct a session of MIME type X, and the mobile device can then generate a request 124 for information regarding at what value should the mobile device 106 start the bit rate for the MIME type X communication that the mobile device 106 is preparing to initiate. Accordingly, if the video is a fixed rate or an adaptive rate video, for example, the mobile device 106 can generate a request 124 for a confirmation of the bit rate at which the mobile device 106 should begin the video at the mobile device.

FIG. 5B illustrates an example, non-limiting block diagram of a mobile device table that can be employed to facilitate determination of bit rate for an application to be executed at the mobile device in accordance with one or more embodiments described herein. Repetitive description of like elements employed in other embodiments described herein is omitted for sake of brevity.

As shown, the mobile device 106 can map the class information to a particular level of bit rate (e.g., maximum possible, minimum possible, intermediate). In some embodiments, although not shown, the mobile device 106 can map the class information to specific numeric values of bit rates at which to initiate the application to be executed via the mobile device 106. In still other embodiments not shown, the mobile device 106 can employ the class information and generate a bit rate value based on an algorithm or mathematical formula for calculating the bit rate based on class information. In some embodiments, the mobile device can update the bit rate based on updated class information received from the control device.

In some embodiments, the mobile device can receive such information (e.g., starting bit rate value) based on querying the throttling and loading state machine device 214 for the class information 126 for the BS device on which the mobile device 106 is communicating. The mobile device 106 can also communicate over the communication path 118 the identity of the BS device 108 that the mobile device 106 is communicating on (as the mobile device can know the identity of the BS device 108).

As used herein, the difference between class information and load is that class takes into account information such as trend, peak-to-average loading ratio and therefore the class takes into account loading whereas loading can be the amount of data being processed by a particular radio. The class information can include load on the radio, whether the load is trending up or trending down, whether it has a high peak-to-average loading ratio and/or if the mobile devices using the radio are changing quickly (e.g., mobility factor).

FIG. 5C illustrates an example, non-limiting block diagram of a control device table that can be employed to facilitate determination of class information in accordance with one or more embodiments described herein. Repetitive description of like elements employed in other embodiments described herein is omitted for sake of brevity.

As shown, the control device can store information such as the loading, trend of loading, peak-to-average loading ratio of loading for one or more radios (e.g., radios 128, 130, 132) of a BS device (e.g., BS device 108) and/or mobility factor of the one or more radios 128, 130, 132. In various embodiments, the control device 102 can select class information for the radio based on the peak-to-average loading ratio of loading, etc. In some embodiments, the control device 102 (and/or the server device 212 or throttling and loading state machine device 214 of the server device 212) can store and/or dynamically update one or more classes for a particular radio of a BS device 108. As such, upon receiving a query via communication path 118, the control device 102 can identify the class information 126 (e.g., lightly loaded, heavily loaded, intermediate level of loading).

In some embodiments, an application executing on the mobile device 106 can receive the class information of the BS device 108, determine the starting bit rate (e.g., maximum or minimum bit rate) at which to start execution of the application. Accordingly, for example, if a BS device 108 is being used at 3 am the mobile device 106 will receive information indicating the class of the BS device 108 through which the mobile device 106 is communicating that indicates the BS device 108 is lightly loaded. The loading can be indicative of the state of the BS device 108. In this case of a lightly loaded BS device 108, the data rate selected by the application for the mobile device 106 can be the maximum bit rate since the BS device 108 is lightly loaded.

By contrast, if there is a mobile device 106 in a major city at rush hour, the query will likely result in class information 126 indicating the BS device 108 is heavily loaded. Accordingly, the application on the mobile device 106 can determine that the bit rate for an application being initiated should be the minimum bit rate for the BS device 108.

Accordingly, in some embodiments, one aspect of the systems 100, 200 (and systems 300, 400 described below) can selectively determine an appropriate starting bit rate for a mobile device. Further, the control device 102 can also independently perform throttling. As described herein, in some embodiments, throttling command information 122 can be sent to the multiservice proxy device 114 or to the packet gateway device 116 to throttle certain domains, subscribers and/or MIME types as a real-time function of radio loading. However, in the process of doing so, since the control device 102 can know the state (e.g., loading) of the BS device 108, the state can be useable by the mobile device 106. The mobile device 106 can use the state of the BS device 108 to which the mobile device 106 is communicatively coupled to determine a bit rate at which to initiate execution of a particular application.

A mobile device 108 preparing to communicate a multimedia session will know the exact radio of the BS device 108 with which it is communicating. The mobile device 106 can make a request 124 to the throttling and loading state machine device 214 using the identification of the particular radio and learn (in some embodiments, in real time) about the loading and throttling applicable to that radio. In some embodiments, the throttling and loading state machine device 214 can be or be included in an edge server device.

In some embodiments, throughout the multimedia data session, the mobile device software application can correspond with the throttling and loading state machine device 214 to learn about current loading conditions at the radio of the BS device 108 to which the mobile device 106 is communicating. Whether at the beginning of a session or during a session, the mobile application no longer needs to transmit ping messages and receive acknowledgements for latency testing or fixed packets for throughput testing. If radio conditions are worsening, the transmission delays or errors can inherently tell the mobile application to lower bit rates if possible. However, if the radio conditions are improving, it may not be inherently evident to the mobile application that it might be able to increase the bit rate. For example, assume the current bit rate is yielding a frame error rate of 0.1% and we may claim that we can double the bit rate and still have solid video quality. However, if the base station device radio throughput is already being throttled, changing the bit rate at the mobile application may be unsuccessful because such may increase the bit rate temporarily only to then be throttled more substantially. This would likely cause an experience for the subscriber that is undesirable. The appearance of a video would change significantly, for example, and cause distraction. Discrete loading levels presented at the edge server or transmitted via a broadcast channel of the radio can be used to compel discrete behaviors of the mobile application in setting bit rates for multimedia sessions.

If a BS device radio is heavily loaded, it is less likely to support high bit rate video sessions. If the mobile application begins a video session using high bit rate, it is more prone to failure, frame pausing, and eventually downgrading of the bit rate (assuming the bit rate is variable). If the bit rate is not variable, the multimedia session is more prone to failure. Current methods cause mobile applications to test radio links by sending ping messages and receive acknowledgements to test latency and send data packets on the order of 10 kilobytes (KB) to discover throughput information. Unfortunately, this can cause delay in the establishment of the multimedia session and can also tax the radio interface.

With reference again to FIG. 1, the control device 102 can also include memory 138 and processor 140. The memory 138 can store instructions that can be executed by processor 140 to perform one or more functions of control device 102 including, but not limited to, determination of throttling command information 122, determination of class information 126, determination of trending of load at the BS device 108, etc.

Figure 3:
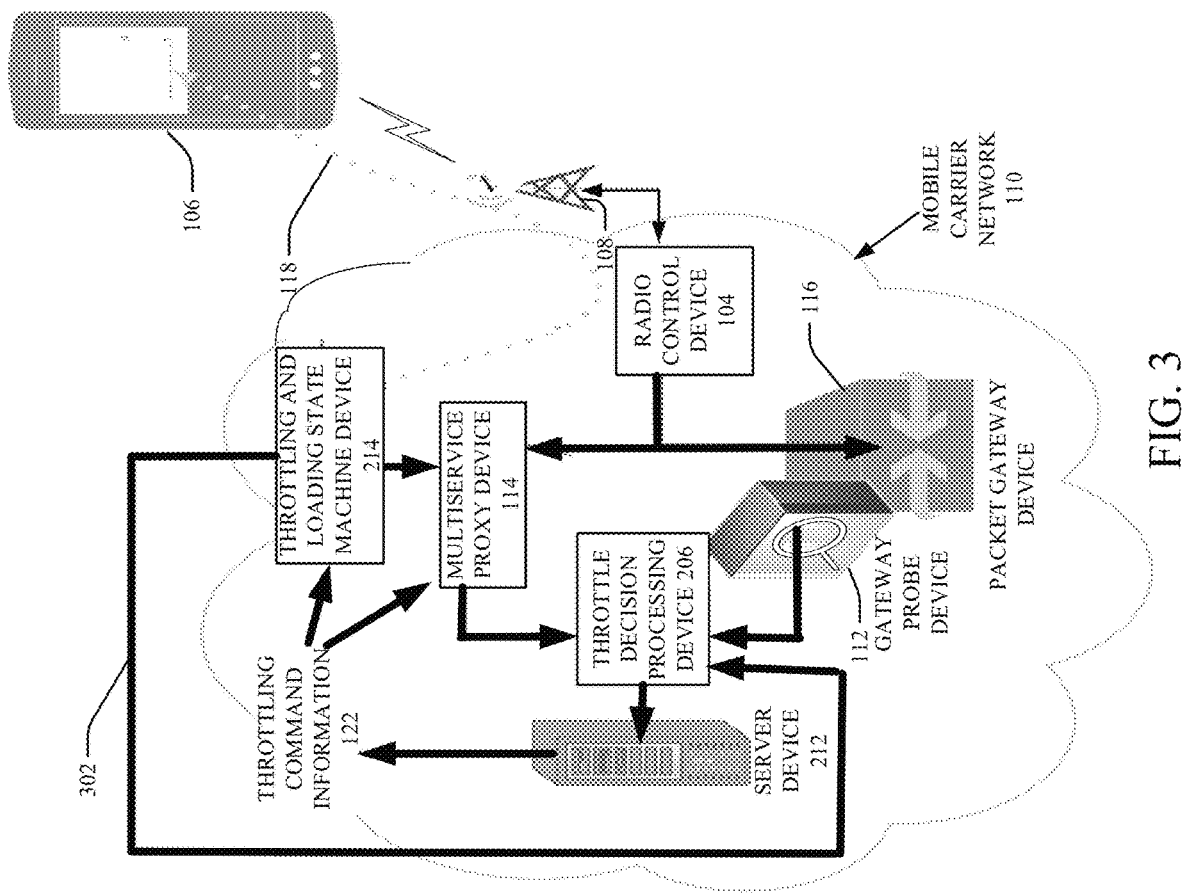
FIG. 3 illustrates an example, non-limiting another system that facilitates communication of radio resource quality to a mobile application in accordance with one or more embodiments described herein.

FIG. 3 illustrates an example, non-limiting another system that facilitates communication of radio resource quality to a mobile application in accordance with one or more embodiments described herein. Repetitive description of like elements employed in other embodiments described herein is omitted for sake of brevity.

Relative to system 200 of FIG. 2, system 300 of FIG. 3 can include communication path 302 from the throttling and loading state machine device 214 to the throttle decision processing device 206. In this embodiment, the mobile device 106 can provide, to the throttling and loading state machine device 214, information about the application that the mobile device 106 will begin executing. The throttling and loading state machine device 214 can employ such information and/or related information (the likely amount of loading that will be contributed to the BS device 108 once the application begins execution on the mobile device 106. As such, there can be an embodiment (such as that shown in FIG. 3) with a communication path 302 from the throttling and loading state machine device 214 to the throttle decision processing device 206 that would be a notification that there is likely to be more loading in the BS device 108 in the near future. As such, the throttle decision processing device 206 can have a priori knowledge that there is likely to be an upcoming video application (because the throttling and loading state machine device 214 will typically not be queried for applications other than video).

Figure 4:
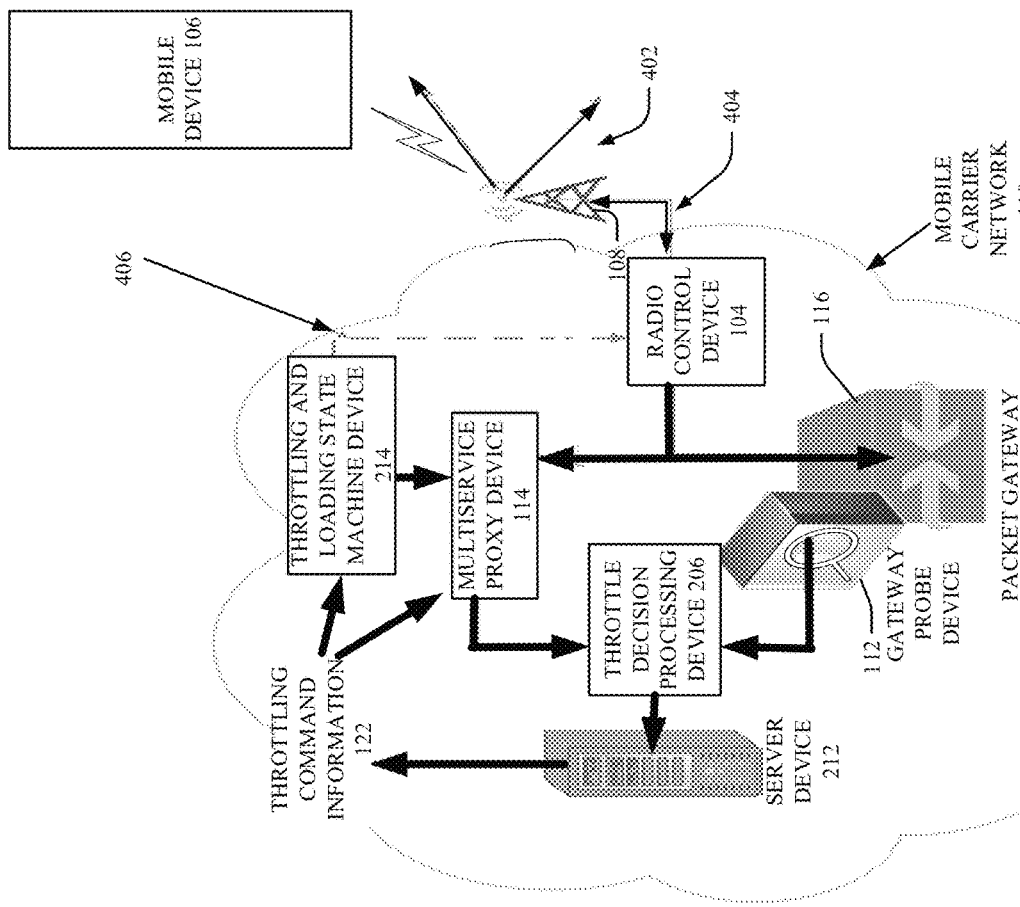
FIG. 4 illustrates an example, non-limiting another system that facilitates communication of radio resource quality to a mobile application in accordance with one or more embodiments described herein.

FIG. 4 illustrates an example, non-limiting another system that facilitates communication of radio resource quality to a mobile application in accordance with one or more embodiments described herein. Repetitive description of like elements employed in other embodiments described herein is omitted for sake of brevity.

Turning to FIG. 4, in lieu of having every mobile device 106 query the throttling and loading state machine device 214, in some embodiments, as an alternative, the BS device 108 can broadcast the state (e.g., loading) of the BS device 108 to the one or more mobile device 106 being served by the BS device 108 over one or more broadcast channels (e.g., broadcast channel 402). In this embodiment, the radio control device 104 can receive information from the throttling and loading state machine device 214 via communication path 406 and transmit to the BS device 108 via a communication path 404. The BS device 108 can have multiple radios on different frequencies. Each radio at the BS device 108 can broadcast on its pilot or common control channel that indicates the identity of the radio and class loading (e.g., radio XYZ has class loading 6) and then a defined amount of time the broadcast can indicate the class loading of that particular radio (so the different broadcasts can indicate different class loading numbers as the loading at the radio changes over time). Mobile devices that are monitoring the common control channel can therefore be aware of the loading state. In this embodiment, there would be no need for the communication path 118 shown in FIGS. 2 and 3 (e.g., in this embodiment, there would be no query from the mobile device 10 to the BS device 108 and/or to the throttling and loading state machine device 214 from the mobile device 106.

In some embodiments, the throttling and loading state machine device 214 can transmit to the radio control device 104 class information 126 for the BS device 108. The throttling and loading state machine device 214 can store the class information 126. In some embodiments, the throttling and loading state machine device 214 can be an in-memory database of one or more (or every) radio for a BS device 108 in the region of interest. The region can be a state or the entire country, as described above. As such, when the mobile device 106 response can be sent from the throttling and loading state machine device 214 regarding the state of a BS device 108. In some embodiments, via the communication path 118 to the throttling and loading state machine device 214, the request 124 for information from the mobile device 106 can be sent while the communication path 118 from the throttling and loading state machine device 214 to the mobile device 106 can carry the class information 126 response from the throttling and loading state machine device 214.

In an alternative embodiment, the throttling and loading state machine device 214 can proactively broadcast to one or more (or, in some embodiments, every) mobile device 106 in the area the state information for all of the radios in the area. The broadcast can be provided periodically or event-based for example, 24/7 hours a day. Accordingly, as the decisions are coming in from the server device 212, the throttling and loading state machine device 214 can hold one or more, or every, state of every BS device 108; however, the throttling and loading state machine device 214 can either respond to mobile device 106 queries or store (or access from a storage location over the internet) the information and forwards the class information 126 to the BS device 108 (and/or one or more of the radios of the BS device 108) (e.g., via forwarding the class information 126 to radio control device 104, which can provide the class information 126 to BS device 108 in some embodiments via communication path 404 of FIG. 4) or the throttling and loading state machine device 214 can perform both functions in some embodiments.

Alternatively, as described below with reference to FIG. 4, system 400, the radio can broadcast its current loading information and any throttling happening in the packet core network. To do so, the radio would have to be informed by the throttling and loading state machine device 214 directly or by proxy from a gateway probe device 112 or multiservice proxy device 114 of throttling status. The mobile device software application is then able to set the most appropriate bit rate at the start of a multimedia session.

While the systems 100, 200, 300, 400 show a single BS device 108, in various embodiments, multiple BS devices can be included in systems 100, 200, 300, 400. Further, in some embodiments, a BS device is described; however, in one or more of these embodiments, one or more radios (e.g., each radio can be associated with a sector for the BS device 108) can be intended. All such embodiments are envisaged.

Accordingly, in one or more embodiments, control-plane information can be combined with user-plane data loading information to create a BS profile (e.g., real-time BS profile) that can be shared with the application (e.g., software application) of one or more mobile devices (e.g., mobile device 106). In some embodiments, the control-plane information can allow the systems 100, 200, 300, 400 to discover and/or know which specific radio of the BS device 108 is being used by which mobile device 106 for an active session. The control device 102 of the systems 100, 200, 300, 400 can generate a list of one or more mobile devices actively using that radio of the BS device 108 at that time.

Separately, in some embodiments, information from a gateway probe device 112 and/or our multiservice proxy device 114 can be employed to discover the amount of data being transmitted in each direction for each mobile device 106. For example, in some embodiments, if there is a dozen mobile devices using a particular radio of a BS device 108 (the radio can be known from the control plane information) and the usage tonnage for each of the radios is known, then the control device 102 can know the total tonnage per radio of BS device 108 for a determined time duration. This tonnage divided by the maximum possible tonnage can equal or approximate the utilization percentage in some embodiments. This utilization percentage can be used for data throughput throttling by inserting time delays in delivery of Transmission Control Protocol/Internet Protocol (TCP/IP) packets.

FIGS. 6, 7, 8 and 9 illustrate flowcharts of methods facilitating communication of radio resource quality to a mobile application in accordance with one or more embodiments described herein.

Figure 6:
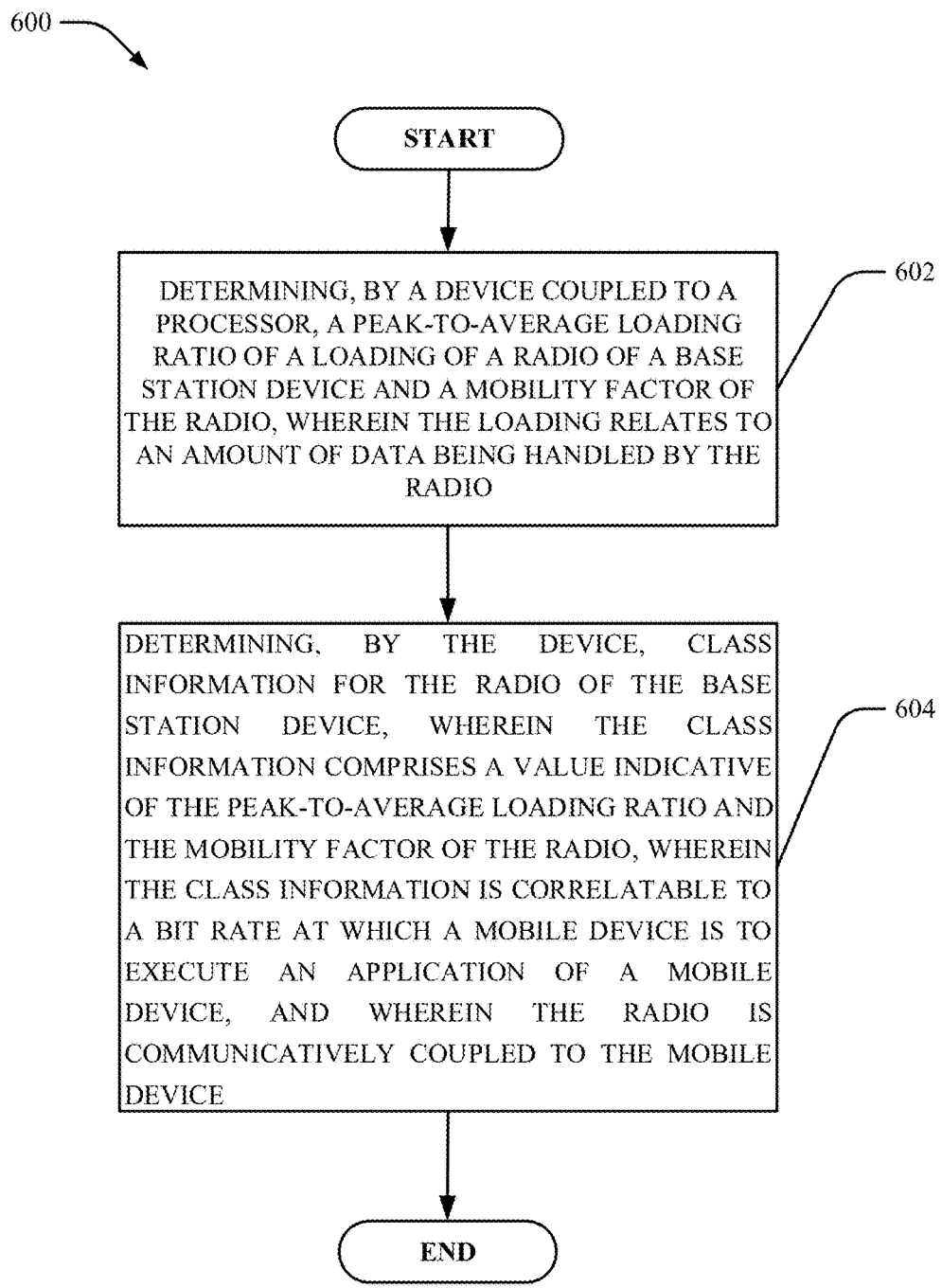
FIGS. 6, 7, 8 and 9 illustrate flowcharts of methods facilitating communication of radio resource quality in accordance with one or more embodiments described herein.

Turning first to FIG. 6, at 602, method 600 can comprise determining, by a device (e.g., control device 102) coupled to a processor, a peak-to-average loading ratio of a loading of a radio of a base station device and a mobility factor of the radio, wherein the loading relates to an amount of data being processed by the radio. In some embodiments, the bit rate comprises an initial bit rate at which to execute the application.

At 604, method 600 can comprise determining, by the device (e.g., control device 102), class information for the radio of the base station device, wherein the class information comprises a value indicative of the peak-to-average loading ratio and the mobility factor of the radio, wherein the class information is correlatable to a bit rate at which a mobile device is to execute an application of a mobile device, and wherein the radio is communicatively coupled to the mobile device. In some embodiments, the class information is further based on a trend of the loading of the radio over a defined amount of time.

Figure 7:
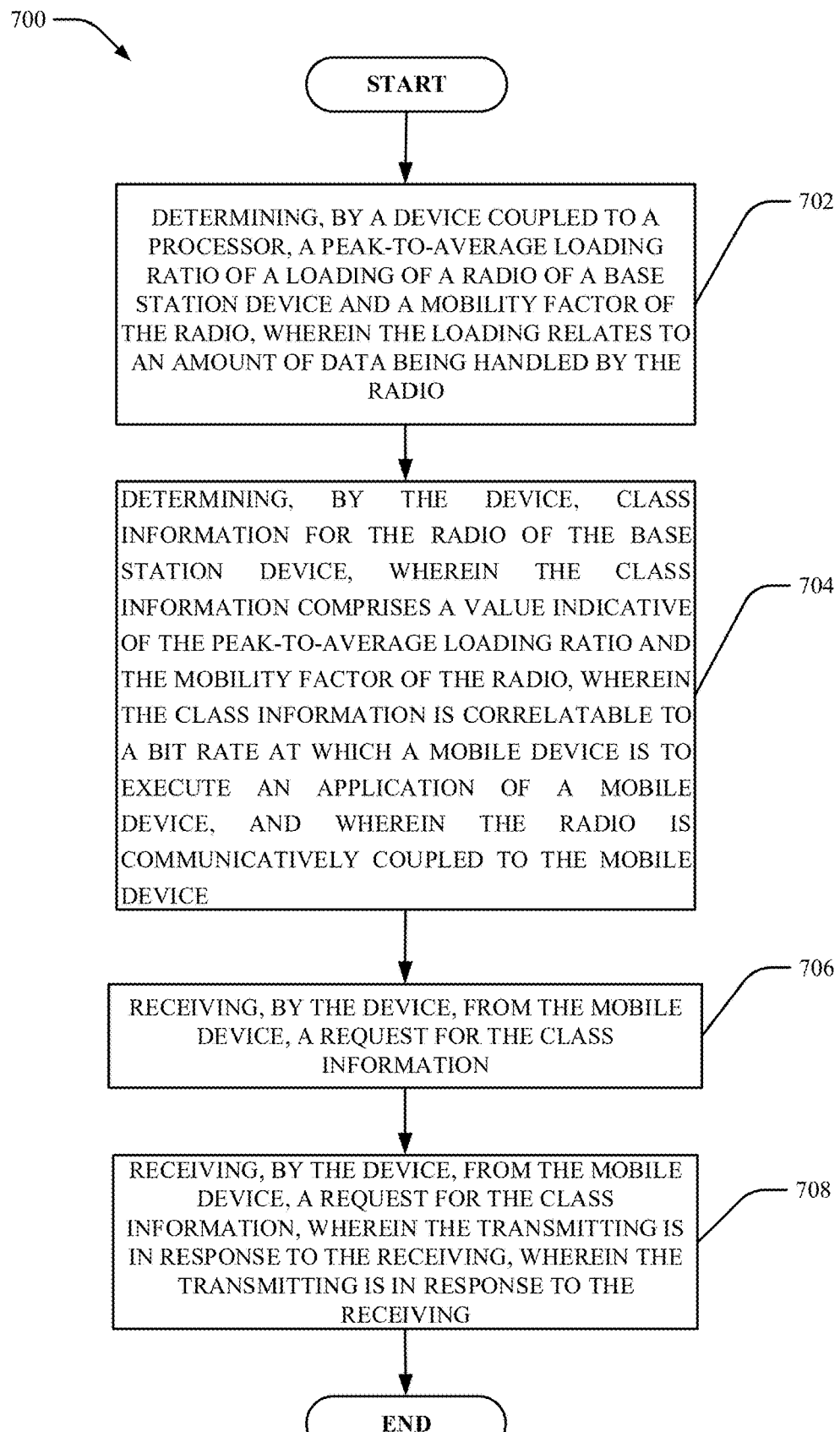
Figure 8:
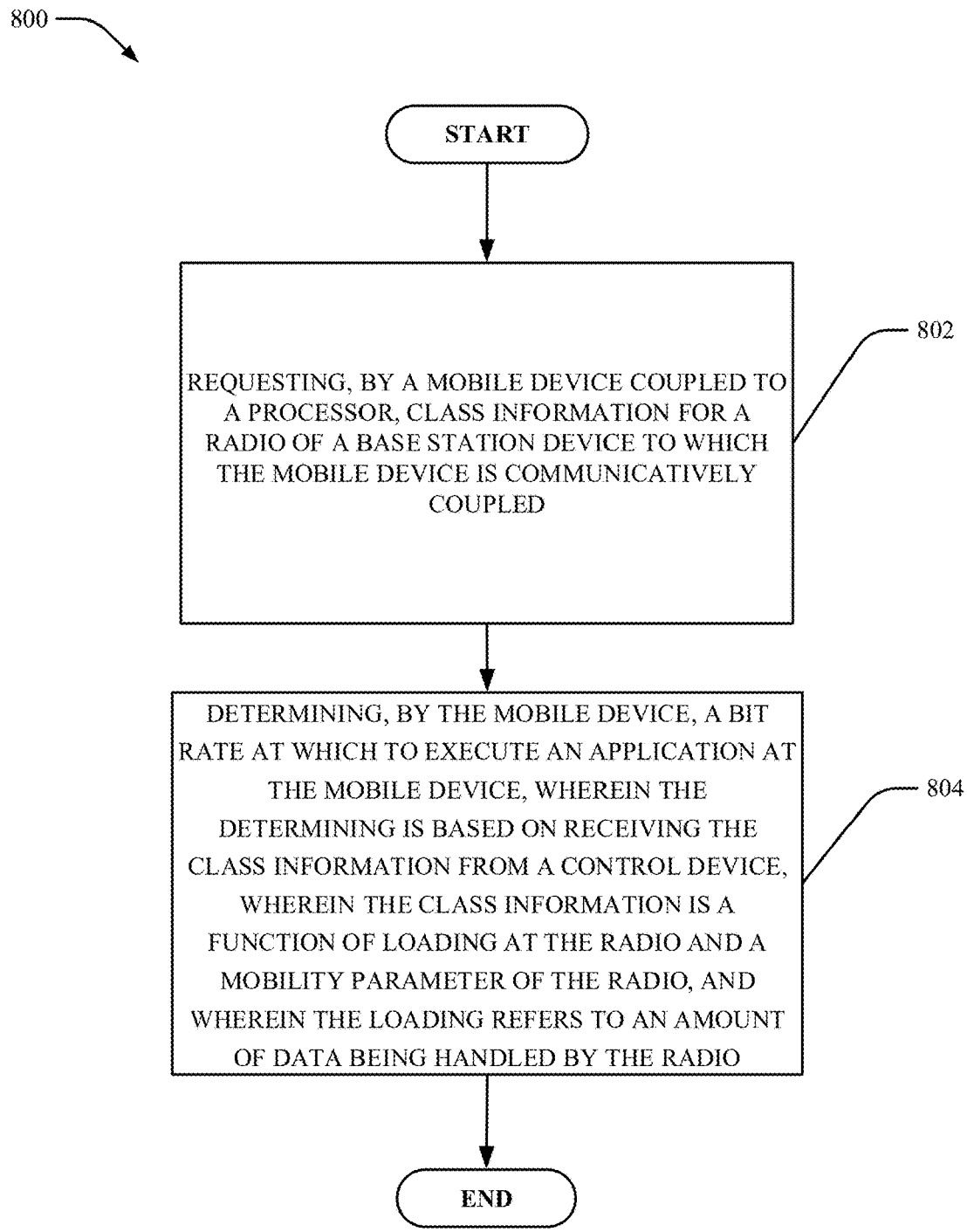

Turning next to FIG. 7, at 702, method 700 can comprise determining, by a device (e.g., server device 212 of control device 102) coupled to a processor, a peak-to-average loading ratio of a loading of a radio of a base station device and a mobility factor of the radio, wherein the loading relates to an amount of data being processed by the radio. In some embodiments, the bit rate comprises an initial bit rate at which to execute the application.

At 704, method 700 can comprise determining, by the device (e.g., throttling and loading state machine device 214 of control device 102), class information for the radio of the base station device, wherein the class information comprises a value indicative of the peak-to-average loading ratio and the mobility factor of the radio, wherein the class information is correlatable to a bit rate at which a mobile device is to execute an application of a mobile device, and wherein the radio is communicatively coupled to the mobile device. In some embodiments, the class information is further based on a trend of the loading of the radio over a defined amount of time.

At 706, method 700 can comprise receiving, by the device (e.g., throttling and loading state machine device 214 of control device 102), from the mobile device, a request for the class information. At 708, method 700 can comprise transmitting, from the device (e.g., throttling and loading state machine device 214 of control device 102) to the mobile device, the class information for determination of the bit rate by the mobile device, wherein the transmitting is in response to the receiving Turning now to FIG. 8, at 802, method 800 can comprise requesting, by a mobile device (e.g., mobile device 106) coupled to a processor, class information for a radio of a base station device to which the mobile device is communicatively coupled.

At 804, method 800 can comprise determining, by the mobile device (e.g., application processing component 142 of mobile device 106), a bit rate at which to execute an application at the mobile device, wherein the determining is based on receiving the class information from a control device, wherein the class information is a function of loading at the radio and a mobility parameter of the radio, and wherein the loading refers to an amount of data being handled by the radio. In some embodiments, the determining comprising determining that the bit rate at which to execute the application is a first bit rate based on the class information being determined to comprise a first value or is a second bit rate based on the class information being determined to comprise a second value different than the first value.

Figure 9:
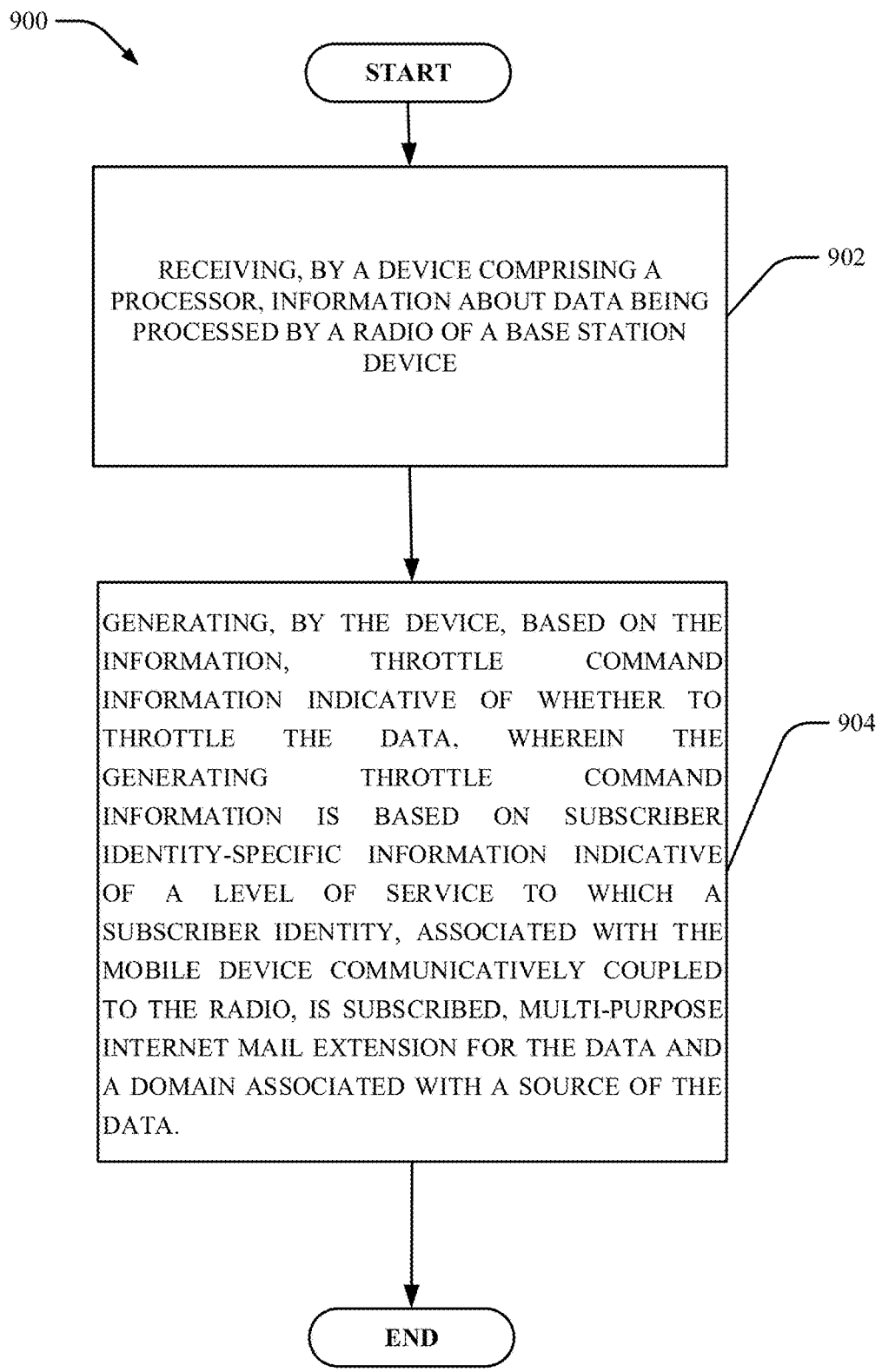

Turning now to FIG. 9, at 902, method 900 can comprise receiving, by a device (e.g., control device 102) comprising a processor, information about data being processed by a radio of a base station device. At 904, method 900 can comprise generating, by the device (e.g., control device 102), based on the information, throttle command information indicative of whether to throttle the data, wherein the generating throttle command information is based on subscriber identity-specific information indicative of a level of service to which a subscriber identity, associated with the mobile device communicatively coupled to the radio, is subscribed, multi-purpose internet mail extension for the data and a domain associated with a source of the data. In some embodiments, the domain comprises a geographic domain with which a network address is associated.

Figure 10:
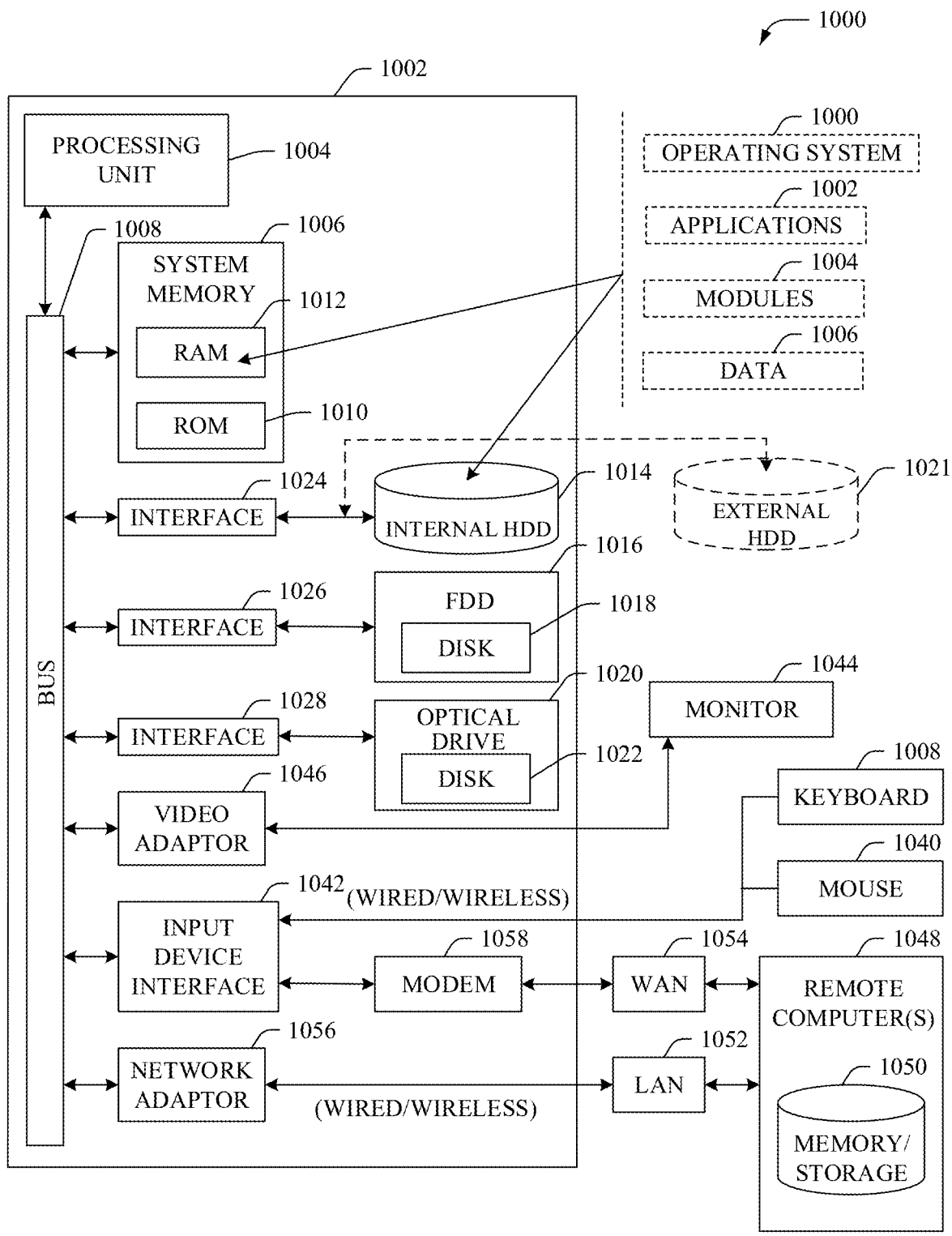
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, control device 102, mobile device 106, radio control device 104, base station device 108, mobile device 106 (or a component of control device 102, mobile device 106, radio control device 104, base station device 108 and/or mobile device 106).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device coupled to a processor, a mobility factor of a radio of a base station, wherein the mobility factor comprises an amount of change in a number of and identities of mobile devices being processed by the radio of the base station over a time period;
   determining, by the device, class information for the radio of the base station, wherein the class information comprises a value indicative of the mobility factor of the radio, wherein the class information is correlatable to a bit rate at which a mobile device is to execute an application of the mobile device, and wherein determining the class information is performed instead of a process of testing, by the mobile device, a throughput of a radio link communicatively coupled to the mobile device; and
   based on a loading of the radio, generating, by the device, throttle command information indicative of whether to throttle data, wherein the generating is performed at a first rate based on a first determination that the mobility factor is less than a defined threshold and is performed at a second rate based on a second determination that the mobility factor is not less than the defined threshold.

2. The method of claim 1, wherein the bit rate comprises an initial bit rate at which to execute the application.

3. The method of claim 2, wherein the class information is further based on a trend of loading of the radio over a defined amount of time.

4. The method of claim 1, further comprising:
   transmitting, from the device to the mobile device, the class information for determination of the bit rate by the mobile device.

5. The method of claim 4, further comprising:
   receiving, by the device, from the mobile device, a request for the class information, wherein the transmitting is in response to the receiving.

6. The method of claim 1, wherein generating the throttle command information is further based on a multi-purpose internet mail extension for the data and a domain from which the data has been determined to originate.

7. The method of claim 6, wherein the domain comprises a geographic domain with which a website is associated.

8. The method of claim 1, wherein generating the throttle command information is further based on subscriber identity-specific information indicative of a level of service to which a subscriber identity, associated with the mobile device communicatively coupled to the radio, is entitled.

9. A method, comprising:
   receiving, by a mobile device of mobile devices, a broadcast message via a broadcast channel to the mobile devices from a base station, loading information and class information for a radio of the base station to which the mobile device is communicatively coupled, and wherein the receiving is performed without querying for the broadcast message by the mobile device; and
   determining, by the mobile device, a bit rate at which to execute an application at the mobile device, wherein the determining is based on receiving the loading information and the class information, wherein the class information is a function of a mobility parameter of the radio, wherein the mobility parameter of the radio of the base station comprises an amount of change in a number of and identifiers for the mobile devices being processed by the radio of the base station over a defined amount of time, and wherein determining the bit rate obviates a need for the mobile device to test a latency of a radio link communicatively coupled to the mobile device.

10. The method of claim 9, wherein the determining comprising determining that the bit rate at which to execute the application is a first bit rate based on the class information being determined to comprise a first value or is a second bit rate based on the class information being determined to comprise a second value different than the first value.

11. The method of claim 9, further comprising:
    initiating, by the mobile device, execution of the application at the bit rate.

12. The method of claim 9, wherein the radio is one of multiple radios of the base station that communicate using respective different frequencies, wherein the broadcast channel is a pilot channel that indicates an identity of the radio, the class information for the radio, the loading information for the radio, and a defined amount of time for which the class loading is applicable.

13. A non-transitory machine-readable medium, comprising executable instructions that, when executed by a processor, facilitate performance of operations, comprising:
    determining a first radio of a base station and a first mobility factor of the radio, wherein the mobility factor comprises a change in a number of and identification information for mobile devices being processed by the radio of the base station as a function of time;
    determining first class information for the first radio of the base station, wherein the first class information comprises: a value indicative of the mobility factor of the first radio, wherein the first class information is correlatable to a bit rate at which an application is to be executed on a mobile device of the mobile devices, and wherein the determining the first class information replaces a latency test of a radio link communicatively coupled to the mobile device; and
    broadcasting, to the mobile devices, via broadcast channels and without receiving a query related to the broadcasting from the mobile devices, a first combination of first loading information and the first class information for the first radio and a second combination of second loading information and second class information for a second radio of the base station, wherein the first combination is broadcast via a first pilot channel of the first radio and wherein the second combination is broadcast via a second pilot channel of the second radio.

14. The non-transitory machine-readable medium of claim 13, wherein the bit rate comprises an initial bit rate at which to execute the application prior to updating the bit rate to a subsequent bit rate different than the initial bit rate at which the application is to be further executed.

15. The non-transitory machine-readable medium of claim 13, wherein the first class information is further based on whether the radio is trending toward a change in class over a defined amount of time.

16. The non-transitory machine-readable medium of claim 13, wherein the operations further comprise:
generating throttle command information indicative of whether to decrease the loading of data to the first radio based on a multi-purpose internet mail extension for the data.

17. The non-transitory machine-readable medium of claim 13, wherein the operations further comprise:
generating throttle command information indicative of whether to decrease the loading of data to the first radio based on a domain associated with a source of the data, wherein the domain comprises a geographic domain with which a network address is associated.

18. The non-transitory machine-readable medium of claim 13, wherein the operations further comprise:
updating the first class information, resulting in updated first class information; and
updating the bit rate based on the updated first class information.

19. The non-transitory machine-readable medium of claim 13, wherein the first combination further comprises a defined amount of time that the first class information is applicable for the first radio.

20. The non-transitory machine-readable medium of claim 13, wherein the second combination further comprises a defined amount of time that the second class information is applicable for the second radio.

* * * * *